United States Patent
Bashyam et al.

(10) Patent No.: US 10,917,260 B1
(45) Date of Patent: Feb. 9, 2021

(54) DATA MANAGEMENT ACROSS CLOUD STORAGE PROVIDERS

(71) Applicant: CloudLanes, Santa Clara, CA (US)

(72) Inventors: Murali Bashyam, Fremont, CA (US); Abhijit Dinkar, San Jose, CA (US)

(73) Assignee: DRUVA, Sunnyvale, CA (US)

( * ) Notice: Subject to any disclaimer, the term of this patent is extended or adjusted under 35 U.S.C. 154(b) by 51 days.

(21) Appl. No.: 15/792,103

(22) Filed: Oct. 24, 2017

(51) Int. Cl.
| | |
|---|---|
| H04L 12/46 | (2006.01) |
| G06F 9/54 | (2006.01) |
| G06F 12/10 | (2016.01) |
| G06F 9/455 | (2018.01) |
| H04L 29/08 | (2006.01) |
| G06F 16/182 | (2019.01) |
| G06F 9/50 | (2006.01) |

(52) U.S. Cl.
CPC ...... *H04L 12/4633* (2013.01); *G06F 9/45558* (2013.01); *G06F 9/54* (2013.01); *G06F 12/10* (2013.01); *G06F 16/183* (2019.01); *H04L 67/2804* (2013.01); *G06F 9/5077* (2013.01); *G06F 2009/45595* (2013.01)

(58) Field of Classification Search
USPC ...................................................... 709/219
See application file for complete search history.

(56) References Cited

U.S. PATENT DOCUMENTS

| | | | |
|---|---|---|---|
| 2012/0084445 A1* | 4/2012 | Brock | G06F 9/5077 709/226 |
| 2013/0024424 A1 | 1/2013 | Prahlad et al. | |
| 2013/0110778 A1 | 5/2013 | Taylor et al. | |
| 2014/0082349 A1* | 3/2014 | Zarfoss, III | H04L 9/321 713/155 |
| 2014/0280061 A1* | 9/2014 | Elkhou | G06F 16/93 707/722 |
| 2015/0256617 A1* | 9/2015 | Klose | G06F 16/972 709/217 |
| 2016/0004466 A1* | 1/2016 | Lakshman | G06F 3/0661 711/114 |
| 2016/0048408 A1* | 2/2016 | Madhu | G06F 11/2023 718/1 |

* cited by examiner

*Primary Examiner* — Hermon Asres
(74) *Attorney, Agent, or Firm* — Kwan & Olynick LLP

(57) ABSTRACT

Techniques and mechanisms described herein provide for facilitating communications between one or more client machines and one or more cloud storage providers. According to various embodiments, a virtual machine may communicate with one or more client machines via a standard data storage protocol. The virtual machine may also communicate with one or more cloud storage providers via the internet. The virtual machine may then perform operations such as receiving data from a client machine and storing it to the cloud, retrieving data from the cloud and providing it to the client machine, querying data stored in the cloud, reporting on and verifying data stored in the cloud, and transferring and/or transforming data stored in the cloud.

19 Claims, 9 Drawing Sheets

DATA MANAGEMENT ACROSS CLOUD STORAGE PROVIDERS

TECHNICAL FIELD

The present invention generally relates to data management across various public cloud storage providers, and more particularly relates to a method and a system for managing vast amounts of data across public cloud storage providers by implementing various parameters such as data tracking, replication and tiering of meta-data stored in a central database.

DESCRIPTION OF RELATED ART

Enterprise data backup/archive applications typically interface with storage devices using standard storage protocols such as Network File System (NFS), Common Internet File System (CIFS), Internet Small Computer Systems Interface (iSCSI) Tape, Fiber Channel Tape, and Network Data Management Protocol (NDMP). These interfaces are generally presented by high performance, low latency storage systems.

A storage administrator is also accustomed to a variety of storage management features such as centralized management of all storage assets, usage tracking, seamless data movement across storage tiers, snapshot and cloning of storage objects such as files, directories, volumes, and tapes.

Cloud storage, on the other hand, is high latency, low performance storage and does not support standard storage protocols mentioned above. There is a lack of standardized storage access and management functionality in the area of cloud storage. Consequently, each user of cloud storage has to heavily customize their application to use proprietary application programming interfaces (APIs) provided by cloud storage vendor such as Amazon Web Service (AWS), Microsoft Azure, Google Cloud and several others.

Accordingly, improved techniques for interacting with cloud storage systems are desired.

SUMMARY

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Various embodiments of the present invention relate generally to devices, systems, methods, and non-transitory machine-readable media for facilitating communications between client machines and cloud storage providers. According to various embodiments, a computing device may include a memory module, a communications interface, and a processor. The communications interface may be operable to receive a designated data object from a client machine via a standard data storage protocol and to store the designated data object at a designated cloud storage location. The processor may be operable to implement a virtual machine configured to communicate with a metadata system to create a designated metadata entry that includes the designated cloud storage location. The metadata system may be configured to store file system data that includes a respective metadata entry for each of a plurality of data objects including the designated data object. Each metadata entry may include a respective cloud storage location at which the data object is stored. The respective cloud storage location may correspond with a respective one of a plurality of available cloud storage providers.

According to various embodiments, the plurality of available cloud storage providers may include Amazon Web Services (AWS), Microsoft Azure, and Google Cloud. In some embodiments, each metadata entry may include a respective client identifier, the client identifier corresponding with a respective one of a plurality of client accounts, the client account being the owner of the data object associated with the metadata entry.

According to various embodiments, the virtual machine may be configured to receive a request to retrieve the designated data object. The virtual machine may also be configured to communicate with the metadata system to identify the designated cloud storage location. The virtual machine may also be configured to communicate with the metadata system to retrieve the designated data object from the designated cloud storage location and to transmit the designated data object to the client machine. The virtual machine may also be configured to receive a search query that includes one or more search criteria for identifying data objects stored via the virtual machine.

According to various embodiments, the virtual machine may also be configured to communicate with the metadata system to identify a first set of data objects that may meet one or more of the search criteria. The virtual machine may also be configured to access one or more or more of the first set of data objects to determine a second set of data objects that meet one or more of the search criteria, the second set of data objects being a subset of the first set of data objects. The virtual machine may also be configured to create a respective metadata asset tracking entry corresponding to each of the second set of data objects.

In particular embodiments, the metadata system may be configured to maintain chain of custody data that includes a plurality of chain of custody metadata entries that each indicate an action performed with respect to a data object. Each chain of custody metadata entry may identify an actor that performed the indicated action.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

DESCRIPTION OF EXAMPLE EMBODIMENTS

Figure 1:
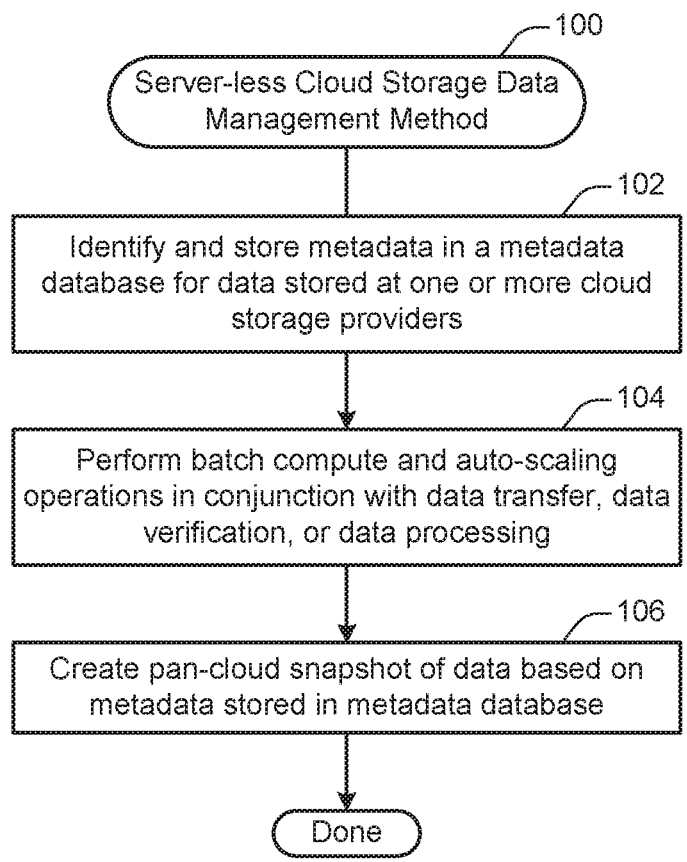
FIG. 1 illustrates a method 100 for managing data across public cloud storage providers using a server-less architecture, performed in accordance with one or more embodiments.

Reference will now be made in detail to some specific examples of the invention including the best modes contemplated by the Murali and Abhijit for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of specific configurations of client machines and cloud storage providers. However, it should be noted that the techniques of the present invention apply to a wide variety of such configurations. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Techniques and mechanisms described herein provide for facilitating communications between one or more client machines and one or more cloud storage providers. According to various embodiments, a virtual machine may communicate with one or more client machines via a standard data storage protocol. The virtual machine may also communicate with one or more cloud storage providers via the internet. The virtual machine may then perform operations such as receiving data from a client machine and storing it to the cloud, retrieving data from the cloud and providing it to the client machine, querying data stored in the cloud, reporting on and verifying data stored in the cloud, and transferring and/or transforming data stored in the cloud.

Example Embodiments

In many companies, client machines are configured to store information such as backup data to a network-attached storage system, with which the client machines communicate via a standard data storage protocol. Because cloud storage providers generally do not support such protocols, this has resulted in creating of a gap in what storage Enterprise backup/archive applications support and how cloud storage presents itself to end user and applications. Moreover, cloud storage management is lacking in terms of pan-cloud storage management functionality that a storage administrator is accustomed to.

According to various embodiments described herein, the network-attached storage system may be replaced with a virtual machine configured to facilitate communication between a client machine and a cloud storage provider. From the perspective of the client machine, the virtual machine appears identical or nearly identical to the network-attached storage system. However, the virtual machine does not store the data locally but instead acts as an interface for storing the data on the appropriate cloud storage system.

According to various embodiments, techniques and mechanisms described herein virtualize cloud storage from multiple vendors and presents standards based access and management interface to cloud storage. Further, techniques and mechanisms described herein may be used to simplify usage of cloud storage by Enterprise Information Technology (IT applications without any change to the application itself.

FIG. 1 illustrates a method 100 for managing potentially vast amounts of data across public cloud storage providers using a server-less architecture, performed in accordance with one or more embodiments. At 102, the metadata describing data stored in the public cloud storage infrastructure is tracked in a central database. Such metadata may include information such as compliance data.

According to various embodiments, tracking the metadata may involve operations such as determining and retaining information such as who stored or accessed a data object and/or when that access occurred. Alternately, or additionally, tracking may involve determining and retaining information such as when copies of data were made and/or when a data object was erased. In particular embodiments, the web and mobile based management user interface runs on scalable web services.

At 104, one or more data processing operations such as batch compute and auto-scaling mechanisms are performed. Such mechanisms may include operations such as data movement, data verification, and data processing for allowing the data to move freely from one public cloud storage provider to another public cloud storage provider.

According to various embodiments, examples of data processing operations may include, but are not limited to: data verification checks, data recoverability drills, data movement between various types of cloud storage, and data movement between cloud vendors. The batch computing and auto-computing results in data movement between clouds that provide independence from being locked into a particular cloud vendor such as Amazon, Google, or Azure.

According to various embodiments, examples of the batch and auto-compute mechanisms include but not limited to Azure Functions and Amazon Web Services (AWS) Lambda. Processing may be employed to perform data transformations for any of a variety of purposes, which may include, but are not limited to: updating data formats, converting data from one application to another application format, or converting a video object from one format. For example, a process may convert a video file from format mpeg to format H.264.

At 106, a pan-cloud snapshot of the data is created using meta-data stored in the central database to give a constant standard view into the data stored in the public cloud storage. In some embodiments, the pan-cloud snapshot results in providing a clear consistent view of the data that is spread across multiple cloud based storage systems.

According to various embodiments, the server-less architecture described herein transforms data regardless of the protocol it was ingested on. For example, tape data ingested over VTL interface is retrieved in the cloud as REST objects. Similarly, media objects written to the system over NFS or CIFS may be streamed on the web using REST protocol interchange or even consumed by a variety of cloud compute mechanisms. This protocol interchange facilitates cloud-based data transformation enabled by this system.

According to various embodiments, techniques and mechanisms described herein provide for a server-less architecture that results in virtually no limitation of the architecture in terms of scalability or performance, capacity and availability of data. In particular embodiments, on-premise storage may be seamlessly replaced with cloud backed storage. In addition, data transformation and other processing may be performed in the cloud.

In some embodiments, techniques and mechanisms described herein facilitate cloud-agnostic data access to backup/archive applications. The storage administrator may configure data movement policies based on usage, access frequency and cost. Data placement and movement may be entirely transparent to an application interacting with the system. That is, techniques and mechanisms described herein virtualize the actual data location from the application while maintaining a uniform unchanging view of the data regardless of which cloud or which tier in a specific cloud the data is actually stored in.

Figure 2:
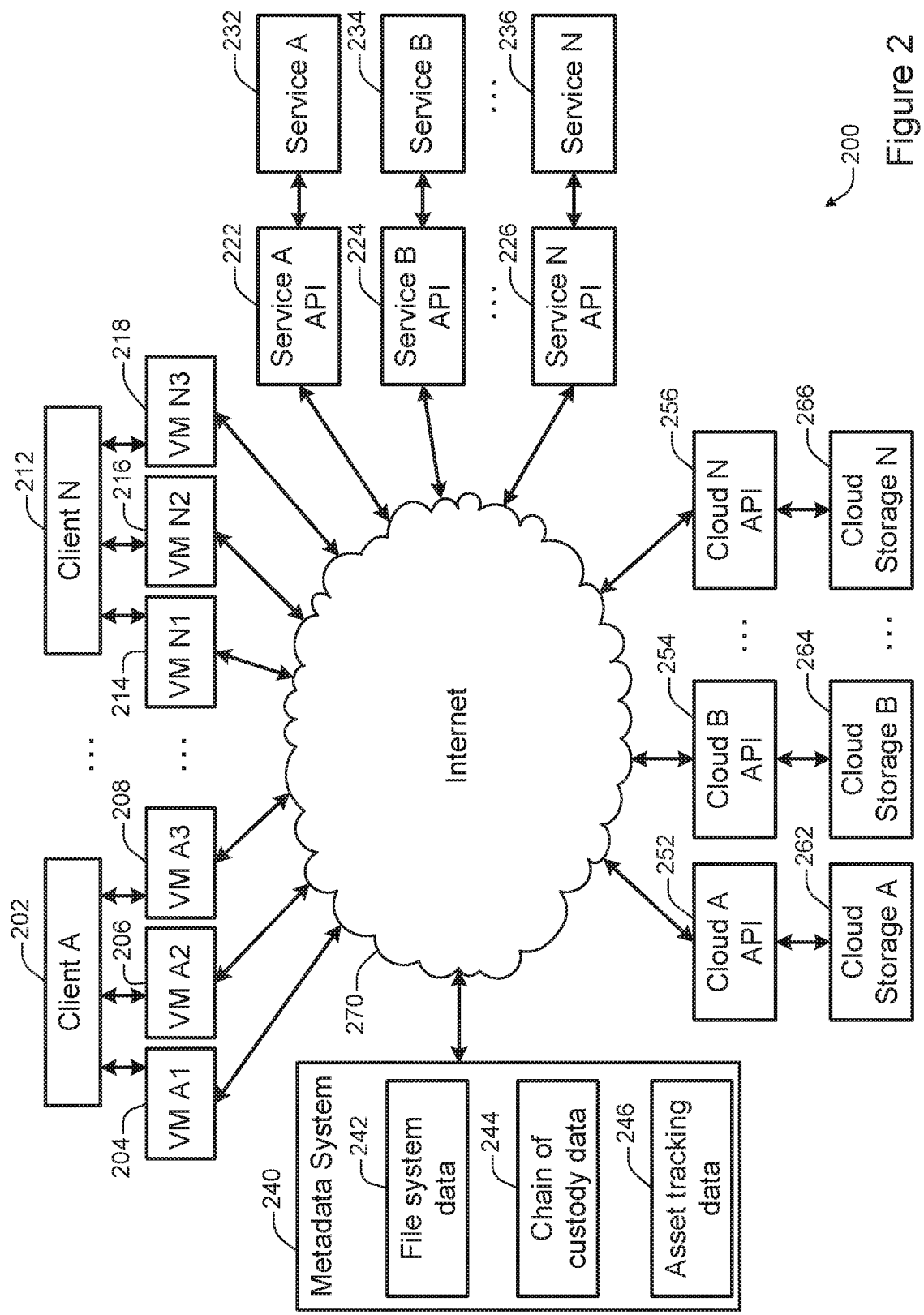
FIG. 2 illustrates an example of a system 200 for managing data across public cloud storage providers using a server-less architecture, configured in accordance with one or more embodiments.

FIG. 2 illustrates an example of a system 200 for managing data across public cloud storage providers using a server-less architecture, configured in accordance with one or more embodiments. According to various embodiments, the system 200 may be configured to facilitate cloud storage operations as described with respect to FIG. 1 and as described in more detail with respect to FIGS. 3-9. The components shown in the system 200 may communicate at least in part via the internet 270. In addition, one or more private networks may be employed for conducting at least some part of the communications.

The system 200 includes cloud storage location A 262, cloud storage location B 264, and cloud storage location N 266. Although only three storage locations are shown in FIG. 2, embodiments of the techniques and mechanisms described herein may include potentially many different storage locations.

According to various embodiments, each cloud storage location is any internet-accessible endpoint where data storage is provided as a service. For example, the cloud storage A 262 may be a storage bucket provided by AWS. As another example, the cloud storage B 264 may be a storage bucket provided by Google Cloud. As yet another example, the cloud storage C 266 may be a blob storage location, queue storage location, file storage location, or disk storage location provided by Microsoft Azure.

In some embodiments, the cloud storage locations communicate respectively via cloud A API 252, cloud B API 254, and cloud N API 256. Each cloud API includes a network address and protocol for communicating with the associated cloud storage location. The API may include one or more operations for storing, retrieving, and interacting with data on the associated cloud storage location. For instance, Google Cloud, Microsoft Azure, and AWS each have different APIs for interacting with data stored in their cloud storage locations.

The system 200 also includes client A 202 through client N 212. According to various embodiments, each client is a set of computing infrastructure corresponding with an individual or business entity. For example, a client may include potentially many different individual client machines associated with a specific company. As another example, a client may include a single client machine associated with an individual. As another example, a client may include a storage server that provides storage services to one or more client machines. Although only two clients are shown in FIG. 2, embodiments of the techniques and mechanisms described herein may include potentially many different clients.

In some embodiments, the clients communicate respectively via virtual machines virtual machine A1 204, virtual machine A2 206, virtual machine A3 208, virtual machine N1 214, virtual machine N2 216, and virtual machine N3 218. Each virtual machine may be configured to perform any of various types of storage-related operations, as described in greater detail with respect to FIGS. 3-9. For example, each virtual machine may be configured to communicate with a client via a standard storage communications protocol such as NFS or CIFS. The virtual machine may also be configured to communicate with one or more cloud storage locations via a cloud storage API such as one or more of the APIs A 252, B 254, and N 256. The virtual machine may also be configured to communicate with the metadata system 240. In addition, the virtual machine may be configured to communicate with one or more cloud services via a cloud service API such as one or more of the APIs A 222, B 224, and N 226.

In particular embodiments, each virtual machine may be configured to communicate via a specific standard storage protocol. Alternately. or additionally, a single virtual machine may be configured to communicate via a variety of standard storage protocols.

In particular embodiments, a virtual machine may be implemented in any of various types of environments. For example, a virtual machine may be implemented on a system provided by a cloud computing service provider. As another example, a virtual machine may be implemented on a system running locally at the client. As another example, a virtual machine may be implemented on a system controlled by the client but running at a location physically remote from the client. As yet another example, a virtual machine may be implemented as a containerized software application configured to run in any suitable containerized application system.

The system also includes cloud service A 232, cloud service B 234, and cloud service N 236. According to various embodiments, a cloud service may be any internet-accessible service provided by a cloud computing service provider. A cloud service may be configured to perform any of a variety of storage-related operations. For example, a cloud service may be configured to convert video files from one format to another format. As another example, a cloud service may be configured to perform operations such as those provided by Microsoft Azure Data Factory or AWS Lambda. As yet another example, a cloud service may be configured to transform data from one storage format to another storage format.

According to various embodiments, the cloud services communicate respectively via cloud service API A 222, cloud service B API 224, and cloud service N API 226. Each cloud service API includes a network address and protocol for communicating with the associated cloud service. The API may include one or more operations for transmitting data to, receiving data from, or otherwise communicating with the associated cloud service. For instance, Google Cloud, Microsoft Azure, and AWS each have different APIs for interacting with their cloud service endpoints.

The system also includes a metadata system 240. According to various embodiments, the metadata system 240 is a location at which any of various types of metadata may be stored. The metadata may provide information about data stored by a client on one or more of the cloud storage locations. For example, the metadata system 240 includes storage infrastructure for storing file system data 242, chain of custody data 244, and asset tracking data 246.

According to various embodiments, the file system data 242 may include object-level information. This object-level information may include, but is not limited to: the file system on which an object is stored, the namespace on which an object is stored, and file block location information such as bucket and object identifiers. In particular embodiments, the file system data 242 may be stored in object storage provided by a cloud storage provider.

According to various embodiments, the chain of custody data 244 may include action-level information. This action-level information may include, but is not limited to: who performed an action, when an action was performed, an identifier for the client associated with the action, an identifier for the object associated with the action, and any other relevant information. An action may include an operation such as reading, storing, copying, or erasing a data object. In particular embodiments, the action-level information may be stored in a format such as Non-structured query language (NoSQL), for instance in a data storage location provided by a cloud storage provider.

According to various embodiments, the asset tracking information may include data such as search results or streaming URIs. The asset tracking information may be used to index or retrieve information stored by a client at a cloud storage provider.

Figure 3:
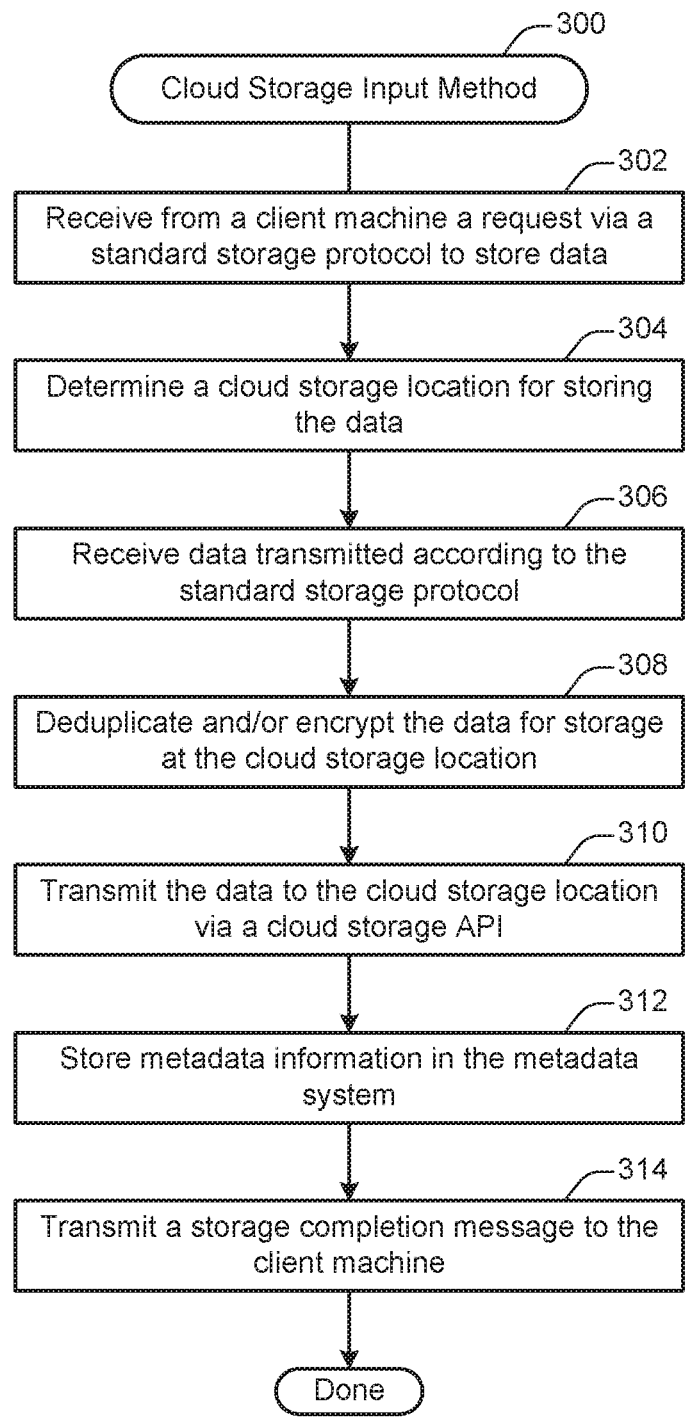
FIG. 3 illustrates an example of a method for storing data on a cloud storage system, performed in accordance with one or more embodiments.

FIG. 3 illustrates an example of a method 300 for storing data on a cloud storage system, performed in accordance with one or more embodiments. According to various embodiments, the method 300 may be performed at a virtual machine in communication with a client, such as the virtual machine A1 204. The method 300 may be performed to receive data from the client and transmit the data to a suitable cloud storage location for storage at that location.

At 302, a request to store data is received from the client machine. According to various embodiments, the request may include information such as the type, size, location, and/or other characteristics of data that the client machine is requesting to store. The request may be transmitted via any of a variety of standard storage protocols such as NFS, CIFS, iSCSI Tape, Fiber Channel Tape, or NDMP.

At 304, a cloud storage location for storing the data is determined. According to various embodiments, the cloud storage location may be specified as a configuration option, for instance by a network administrator. For instance, a configuration option may indicate that a particular type of data, such as periodically-stored file system backup image data, is to be stored at a particular cloud storage location, such as an AWS storage bucket having particular characteristics.

In some embodiments, the cloud storage location may be determined dynamically or automatically. For example, the system may analyze the storage request to determine a suitable storage location. In this example, data that the system predicts may be accessed relatively frequently may be stored in one type of storage location, such as a Google Cloud storage bucket configured for frequent access. At the same time, data that the system predicts may be accessed less frequently may be stored in a different type of storage location, such as a Microsoft Azure storage location configured for long-term and less frequent access.

At 306, data is received from the client machine. According to various embodiments, the data may be transmitted according to the standard storage protocol. In this way, the data may be transmitted from the client machine to the virtual machine in a manner identical to the transmission of data from the client machine to any other networked storage location, such as a conventional networked storage system operated by the client. Thus, the client machine may not need to be reconfigured in order to switch between employing the conventional networked storage system for storing data at the client and employing the virtual machine for storing data in the cloud.

At 308, the data is deduplicated and/or encrypted for storage at the cloud storage location. According to various embodiments, deduplicating and/or encrypting the data may include any operations necessary for placing the data in a format suitable for storage.

In particular embodiments, the data may be stored in a deduplicated fashion in which it is first divided into data segments. Then, when the data is stored, references to the data segments are maintained such that full copies of duplicated data segments need not be stored on the system. Instead, a single copy of a duplicated data segment may be stored along with one or more references to the data segment that indicate information such as the file with which the data segment is associated and a storage location for the data segment.

In particular embodiments, the data may be encrypted for storage in the cloud. For example, the virtual machine may maintain a private key and encrypt the data via any of a number of different encryption protocols prior to storage. In this way, the data may be kept secret from the cloud storage provider itself as well as any attackers that successfully gain access to the data stored at the cloud storage provider.

At 310, the data is transmitted to the cloud storage location via a cloud storage API. For example, the transformed data may be transmitted to a Google Cloud storage bucket via the Google Cloud API.

At 312, metadata is stored in a metadata system, such as the metadata system 240 shown in FIG. 2. In some embodiments, the stored metadata may include file system data indicating object-level information such as the file system on which an object is stored, the namespace on which an object is stored, and file block location information such as bucket and object identifiers. Alternately, or additionally, the stored metadata may include action-level information such as who requested the storage operation, when the storage operation was performed, an identifier for the client associated with the storage operation, an identifier for the object associated with the storage operation, and any other relevant information.

At 314, a storage completion message is transmitted to the client machine. According to various embodiments, the storage completion message may indicate that the storage request was successful. In particular embodiments, the storage completion message may be transmitted via the same standard storage protocol used by the client machine at operation 302 to transmit the storage request and at 306 to transmit the data. In this way, the transmission of the storage completion message to the client machine may be conducted in a manner identical to the transmission of a storage completion message to the client machine from a conventional networked storage system operated by the client.

In particular embodiments, one or more of the operations shown in FIG. 3 may be omitted. For example, in some instances data may not need to be transformed in order to store it at the cloud storage location.

Figure 4:
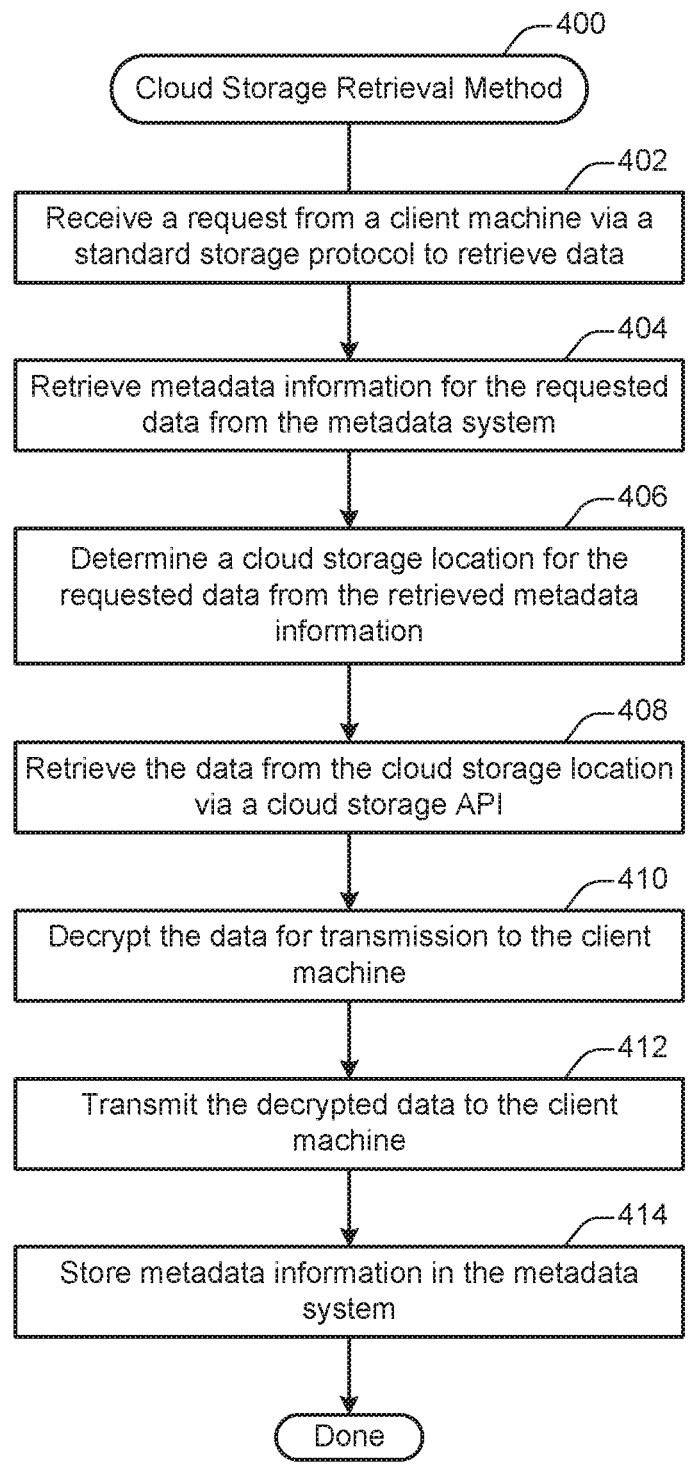
FIG. 4 illustrates an example of a method for retrieving data from a cloud storage system, performed in accordance with one or more embodiments.

FIG. 4 illustrates an example of a method 400 for retrieving data from a cloud storage system, performed in accordance with one or more embodiments. According to various embodiments, the method 400 may be performed at a virtual machine in communication with a client, such as the virtual machine A1 204. The method 400 may be performed to retrieve data from a cloud storage location and transmit the data to a client machine.

At 402, a request to retrieve data is received from the client machine. According to various embodiments, the request may include information such as one or more identifiers and/or other characteristics associated with data that the client machine is requesting to retrieve. The request may be transmitted via any of a variety of standard storage protocols such as NFS, CIFS, iSCSI Tape, Fiber Channel Tape, or NDMP.

At 404, metadata information for the requested data is retrieved from the metadata system. In some embodiments, the metadata information may be retrieved by providing the metadata system with identifiers associated with the requested data. Using these identifiers, the metadata system may retrieve file system data for each requested data object.

At 406 a cloud storage location for retrieving the data is determined. According to various embodiments, the cloud storage location may be determined based on the metadata retrieved at operation 404. For example, the metadata may include a correspondence between data identifiers provided by the client machine and cloud storage locations at which the data is stored, the cloud storage location information may include data such cloud storage addresses, as bucket identifiers, and data object identifiers for accessing the requested data.

At 408, the requested data is retrieved from the cloud storage location via a cloud storage API For example, the transformed data may be retrieved from an AWS storage bucket via the Amazon S3 REST API.

At 410, the data is decrypted for transmission to the client machine. According to various embodiments, decrypting the data may include any operations necessary for placing the data in a format suitable for providing to the client machine. For example, the decryption operations performed at operation 410 may be the inverse of those performed at operation 308.

At 412, the decrypted data is transmitted to client machine. According to various embodiments, the data may be transmitted according to the standard storage protocol. In this way, the data may be transmitted from the virtual machine to the client machine in a manner identical to the transmission of data from a conventional networked storage system operated by the client to the client machine. Thus, the client machine may not need to be reconfigured in order to switch between employing the conventional networked storage system for retrieving data stored at the client and employing the virtual machine for retrieving data stored in the cloud.

At 414, metadata is stored in a metadata system, such as the metadata system 240 shown in FIG. 2. In some embodiments, the stored metadata may include action-level information such as who requested the retrieval operation, when the retrieval operation was performed, an identifier for the client associated with the retrieval operation, an identifier for the object associated with the retrieval operation, and any other relevant information.

In particular embodiments, one or more of the operations shown in FIG. 4 may be omitted. For example, in some instances data may not need to be transformed in order to retrieve it from the cloud storage location.

Figure 5:
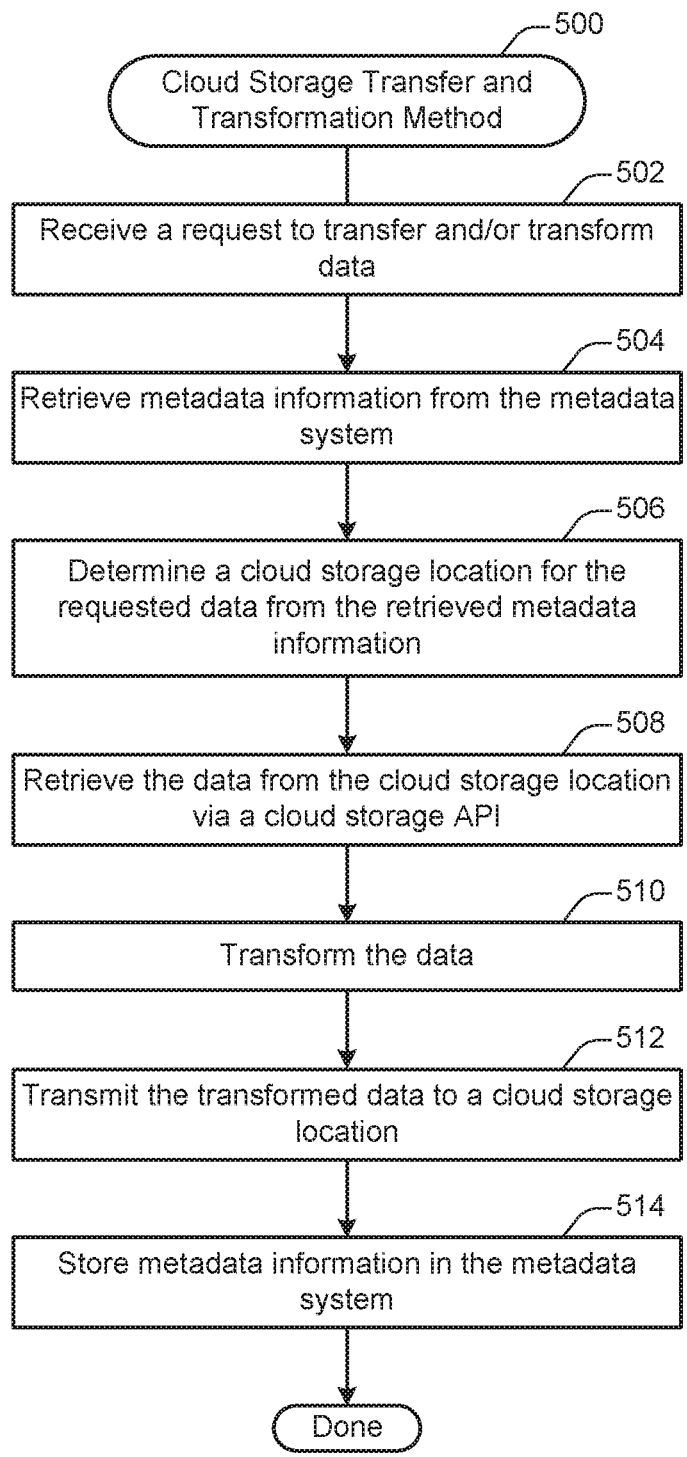
FIG. 5 illustrates an example method for transferring and/or transforming data stored at a cloud storage location, configured in accordance with one or more embodiments.

FIG. 5 illustrates an example method 500 for transferring and/or transforming data stored at a cloud storage location, configured in accordance with one or more embodiments. According to various embodiments, the method 500 may be performed at a virtual machine in communication with a client, such as the virtual machine A1 204. The method 500 may be used to transfer data from one cloud storage location to another. Alternately, or additionally, the method 500 may be used to transform data stored in the cloud from one format to another.

According to various embodiments, one example of an application of the method 500 is video format transformation. For instance, security camera video footage or other types of video footage may be captured and stored in an initial format, such as H.264. Then, the data objects stored in the initial format may be transformed to a format more suitable for live streaming, such as MPEG-DASH. Once the data objects are transformed, a suitable metadata entry may be created for each data object that includes information such as a URI that may be used to access or stream the data object.

In some embodiments, another example of an application of the method 500 is migration between cost tiers. For instance, data may be initially stored at a cloud storage location associated with a relatively high cost tier and relatively low latency since more recently-stored data may tend to be accessed more frequently than less recently-stored data. After a data object has been stored for a designated period of time, the data object may then be transferred to a different storage location associated with a relatively lower cost tier and relatively higher latency. Such a transfer may or may not involve transforming the data object, for instance by compressing it.

At 502, a request to transfer and/or transform data is received from the client machine. According to various embodiments, the request may include information such as the type, size, location, and/or other characteristics of data that the client machine is requesting to store. The request may be transmitted via any of a variety of standard storage protocols such as NFS, CIFS, iSCSI Tape, Fiber Channel Tape, or NDMP. Alternately, or additionally, the request may be transmitted via any other suitable protocol. For instance, the request may be transmitted via an administration interface employed by a systems administrator.

At 504, metadata information for the data is retrieved from the metadata system. In some embodiments, the metadata information may be retrieved by providing the metadata system with identifiers associated with the data. Using these identifiers, the metadata system may retrieve file system data for each data object.

At 506 a cloud storage location for retrieving the data is determined. According to various embodiments, the cloud storage location may be determined based on the metadata retrieved at operation 504. For example, the metadata may include a correspondence between data identifiers provided by the client machine and cloud storage locations at which the data is stored. The cloud storage location information may include data such cloud storage addresses, as bucket identifiers, and data object identifiers for accessing the requested dat.

At 508, the requested data is retrieved from the cloud storage location via a cloud storage API. For example, the transformed data may be retrieved from a Microsoft Azure storage location using the Azure Storage Services REST API.

At 510, the data is transformed. According to various embodiments, transforming the data may include performing any of a variety of operations. Such operations may include, but are not limited to: converting file formats (e.g., MP4 into adaptive streaming content), performing log analytics on logs (e.g., server logs), and building a search index on uploaded data to allow fast search for sensitive or interesting information in large amounts of data.

According to various embodiments, transforming the data may include transmitting it to a cloud service. For example, the virtual machine may transmit a message to a cloud storage location via a cloud storage API. The message may include an instruction instructing the cloud storage location to transmit specific data directly to a cloud storage service for processing. The cloud service may then receive the data directly from the cloud storage location and perform some transformation or processing operation. Upon completion of the operation, the cloud service may transmit the transformed data directly to a cloud storage location, which may be the same location or a different location from which the data was initially retrieved.

According to various embodiments, transforming the data may include performing an operation at the virtual machine. For example, the virtual machine may be configured to perform one or more operations for moving the data from one format to another form.

According to various embodiments, transforming the data may include one or more of a variety of processing operations. For example, data may be transformed from one audio or video format to another audio or video format. As another example, data may be compressed or uncompressed. As yet another example, data may be analyzed and indexed for granular retrieval. Such operations may be performed in isolation or may be combined to transform the data in more than one way. Any suitable transformation operation capable of being performed by the virtual machine or an internet-accessible data transformation service may be employed.

At 512, the transformed data is transmitted to the cloud storage location via a cloud storage API. For example, the transformed data may be transmitted to a Google Cloud storage bucket via the Google Cloud API.

At 514, metadata is stored in a metadata system, such as the metadata system 240 shown in FIG. 2. In some embodiments, the stored metadata may include file system data indicating object-level information such as the file system on which an object is stored, the namespace on which an object is stored, and file block location information such as bucket and object identifiers. Alternately, or additionally, the stored metadata may include action-level information such as who requested the transfer and/or transformation operation, when the transfer and/or transformation operation was performed, an identifier for the client associated with the transfer and/or transformation operation, an identifier for the object associated with the transfer and/or transformation operation, and any other relevant information.

In particular embodiments, the stored metadata may include asset tracking information. For example, the stored metadata may include a respective entry for one or more data objects that includes information about how to access the object. Such access information may include, for instance, a streaming URI that may be used by a media player to stream an audio or video data object.

In particular embodiments, one or more of the operations shown in FIG. 5 may be omitted. For example, in some instances data may not need to be transformed, and may simply be transmitted from one cloud storage location to another cloud storage location. As another example, in some instances after being transformed data may be stored in the same location from which it was retrieved, and need not be transferred to a different storage location.

Figure 6:
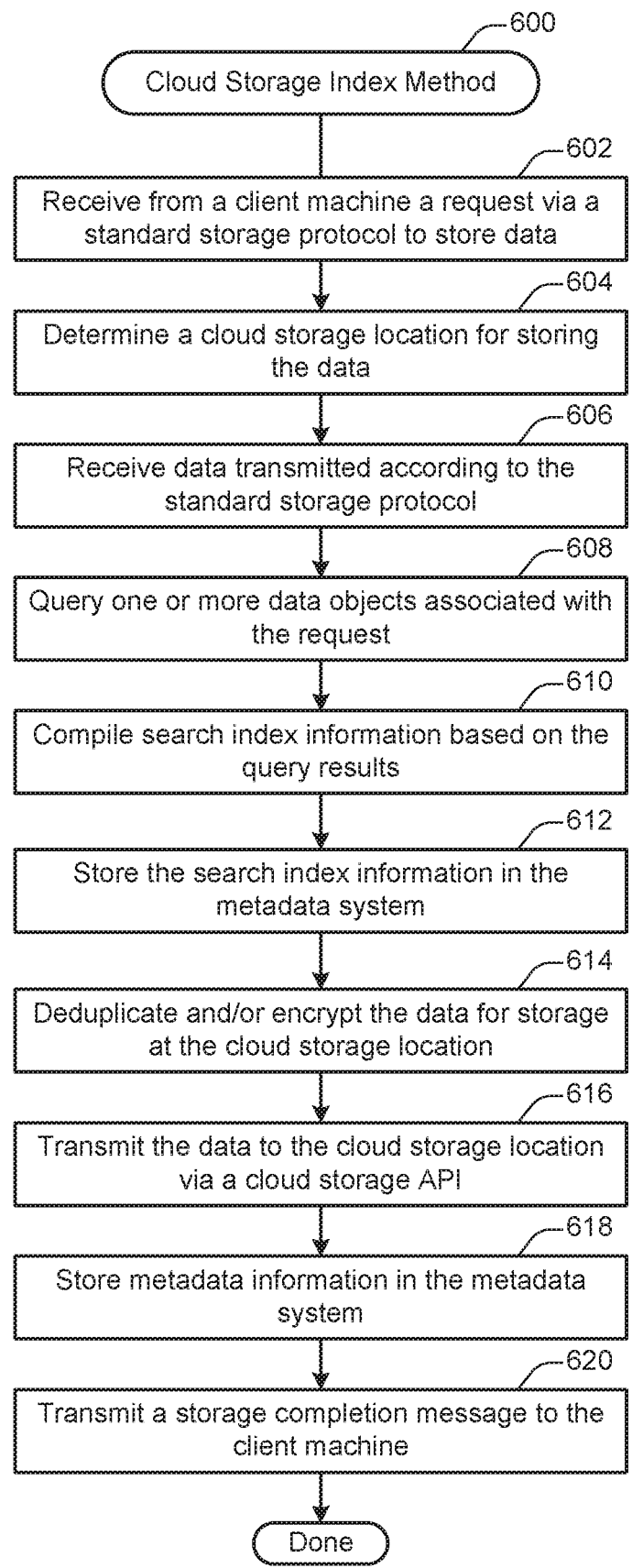
FIG. 6 illustrates an example of a method for indexing data stored atone or more cloud storage locations, performed in accordance with one or more embodiments.

FIG. 6 illustrates an example of a method 600 for indexing data stored at one or more cloud storage locations, performed in accordance with one or more embodiments. According to various embodiments, the method 500 may be performed at a virtual machine in communication with a client, such as the virtual machine A1 204. The method 600 may be used to index data stored at one or more cloud storage locations based on a query received from a client machine. In particular embodiments, the method 600 may be performed when receiving and storing any data in the cloud. Alternately, the method 600 may be performed when receiving and storing data from particular clients or when receiving and storing particular types of data.

According to various embodiments, many of the operations performed in the method 600 may be identical or substantially similar to corresponding operations performed in the method 600. These operations include receiving, at 602, a request from a client machine via a standard storage protocol to store data. Also, determining a cloud storage location for storing the data at 604. Also, receiving data transmitted according to the standard storage protocol at 606. Also, deduplicating and/or encrypting the data for storage at the cloud storage location at 614. Also, transmitting the data to the cloud storage location via a cloud storage API at 616. Also, storing metadata information in the metadata system at 618. Also, transmitting a storage completion message to the client machine.

In addition to these operations, at 608, one or more data objects associated with the request are queried. According to various embodiments, querying a data object may involve accessing the data object or metadata about the data object to determine whether it meets one or more criteria. For example, a text-based data object may be accessed to determine if the object includes a designated text string. As another example, a data object may be accessed to determine its size. As yet another example, metadata may be accessed to identify all data objects stored at a particular cloud storage provider. As still another example, a data object may be accessed to determine its file format.

At 610, search index information is compiled based on the query results. According to various embodiments, the search index information may include data returned from executing the query. For example, the search index information may include a list of objects that meet the query parameters. Each list item may include information such as an object identifier and/or one or more characteristics associated with the object.

By compiling the search index information, the search results may be stored, retrieved, and accessed upon demand. For example, a virtual machine may request one or more objects included in the search index information. As another example, the search index information may serve as a basis for additional queries, such as a refinement of the original search parameters.

At 612, the search index information is stored in the metadata system, such as the metadata system 240 shown in FIG. 2. In some embodiments, the search index information may be stored in such a way that the client can retrieve or query the search results without re-running the search. The search index information may be stored as asset tracking data 246. Techniques for retrieving or querying the search index information are discussed in further detail with respect to FIG. 7.

Figure 7:
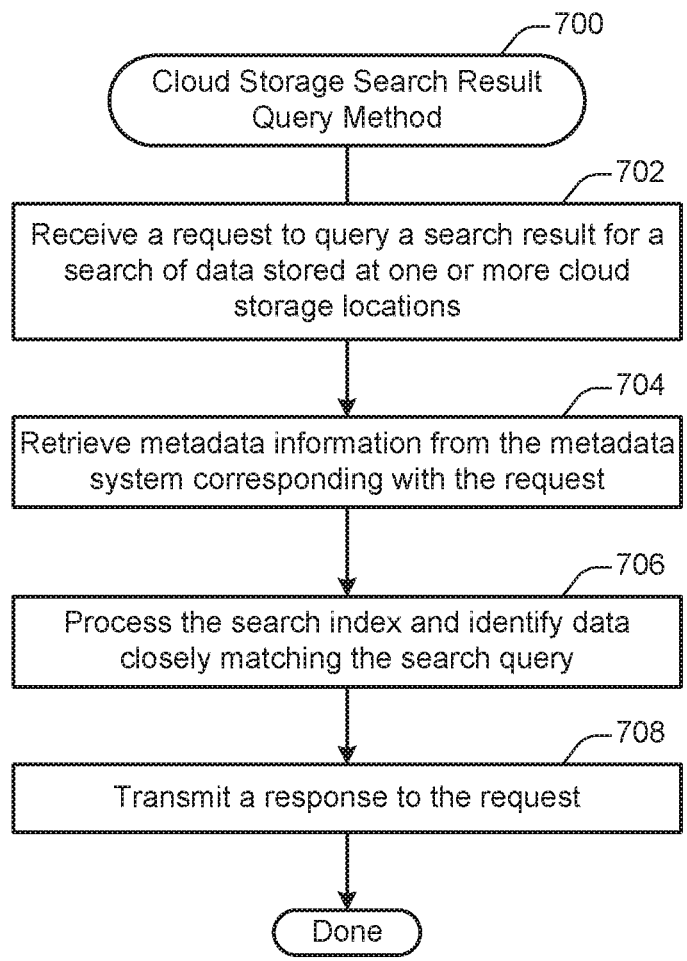
FIG. 7 illustrates an example of a method of querying one or more results returned by searching one or more cloud storage locations, performed in accordance with one or more embodiments.

FIG. 7 illustrates an example of a method 700 of querying one or more results returned by searching one or more cloud storage locations, performed in accordance with one or more embodiments. According to various embodiments, the method 700 may be performed at a virtual machine in communication with a client, such as the virtual machine A1 204. The method 700 may be used to access search results returned by a method such as the method 600 shown in FIG. 6.

At 702, a request to query a search result for a search of data stored at one or more cloud storage locations is received. According to various embodiments, the request may be received from a client machine. The request may be transmitted via any of a variety of standard storage protocols such as NFS, CIFS, iSCSI Tape, Fiber Channel Tape, or NDMP. Alternately, or additionally, the request may be transmitted via any other suitable protocol. For instance, the request may be transmitted via an administration interface employed by a systems administrator.

In some embodiments, the request may include one or more criteria or parameters for identifying elements included in the search results. Such criteria may include, but are not limited to: data object size, data object format, data object contents, a designated cloud storage provider, data object age, and cloud storage location characteristics.

In particular embodiments, a request may indicate a desire to return some or all of the search results directly to the requester. For example, the request may indicate a desire to receive object identifiers for retrieving some or all of the objects identified by the search.

At 704, metadata information corresponding with the request is retrieved from the metadata system. In some embodiments, the metadata information may be retrieved by providing the metadata system with one or more criteria associated with the data to be searched, such as the criteria included in the request received at operation 602. Using these criteria, the metadata system may retrieve search results that meet the designated criteria. The search results may be retrieved, for instance, from the asset tracking data 246 stored at the metadata system.

At 706, the search index is processed and data closely matching the search query is identified. According to various embodiments, processing the search index may involve comparing one or more query parameters to metadata stored in the search index. For example, a query parameter such as file type may be compared with the search index to identify files that match the queried file type.

At 708, a response to the request is transmitted. According to various embodiments, the response may include any suitable information for responding to the query request. For example, the response may include one or more identifiers associated with objects included in the search query. As another example, the response may include metadata, such as the number or size of objects stored in the system that meet the designated criteri.

Figure 8:
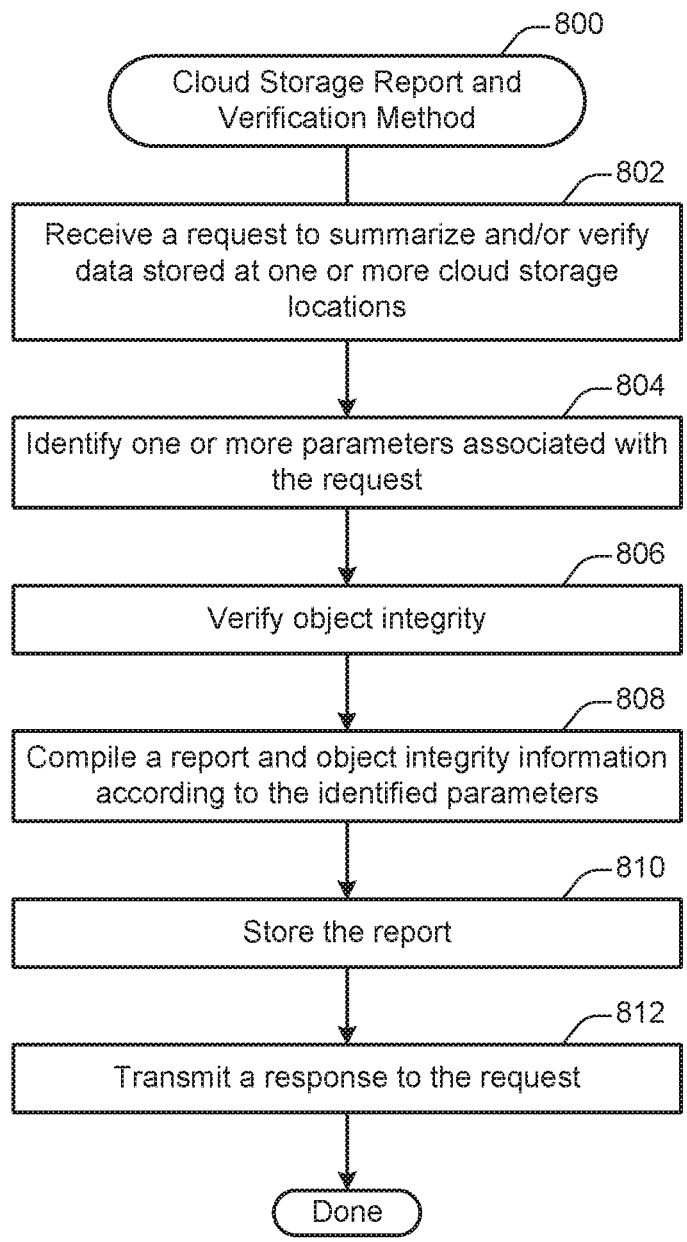
FIG. 8 illustrates an example of a method for reporting on and verifying data stored at one or more cloud storage locations, performed in accordance with one or more embodiments.

FIG. 8 illustrates an example of a method 800 for reporting on and verifying data stored at one or more cloud storage locations, performed in accordance with one or more embodiments. According to various embodiments, the method 800 may be performed at a virtual machine in communication with a client, such as the virtual machine A1 204. The method 800 may be used to verify the integrity of one or more objects stored in the cloud storage system and/or create a report about objects stored in the cloud storage system.

At 802, a request to summarize and/or verify data stored at one or more cloud storage locations is received. According to various embodiments, the request may be received from a client machine. The request may be transmitted via any of a variety of standard storage protocols such as NFS, CIFS, iSCSI Tape, Fiber Channel Tape, or NDMP. Alternately, or additionally, the request may be transmitted via any other suitable protocol. For instance, the request may be transmitted via an administration interface employed by a systems administrator.

At 804, one or more parameters associated with the request are identified. In some embodiments, the request received at operation 802 may include one or more criteria or parameters for identifying elements to be verified and/or reported upon. Such criteria may include, but are not limited to: data object size, data object format, data object contents, a designated cloud storage provider, data object age, and cloud storage location characteristics.

At 806, object integrity is verified. According to various embodiments, verifying object integrity may involve determining, for one or more objects, whether the data associated with the object is complete, accurate, and stored in the location with which the object is associated. For example, the designated storage location associated with a data object may be accessed, and the data associated with the data object may be hashed and then compared with a checksum stored in the file system data in the metadata system. If the data is stored in the designated storage location and hashes to the correct checksum value, then the integrity of the data object may be verified. If instead, the data associated with the object does not hash to the correct checksum value, then data object may be marked as lacking data object integrity.

At 808, a report is compiled according to the identified parameters. In some embodiments, the report may include any of various types of information associated with a client. This information may include, but is not limited to: the number of data objects stored in the cloud, the size of data objects stored in the cloud, the location at which data objects are stored, and object integrity information associated with one or more data objects.

In particular embodiments, object integrity information may also be compiled. The object integrity information may indicate any objects that have failed the object integrity inspection. The report may indicate information such as which objects have failed integrity as well as the overall health of the repository itself.

At 810, the report is stored. According to various embodiments, the report may be stored at one or more cloud storage locations. When the report is stored, an entry may be created in the metadata system that identifies information such as the content and storage location of the report. For instance, the entry may be created in the asset tracking data 246 and/or the file system data 242.

At 812, a response to the request is transmitted. In some embodiments, the response may include the report generated at operation 808. Alternately, or additionally, the response may include object verification information for one or more individual objects.

In particular embodiments, one or more of the operation shown in FIG. 8 may be omitted. For example, object data integrity may be verified without creating a report. As another example, a report may be created without also verifying object data integrity.

Figure 9:
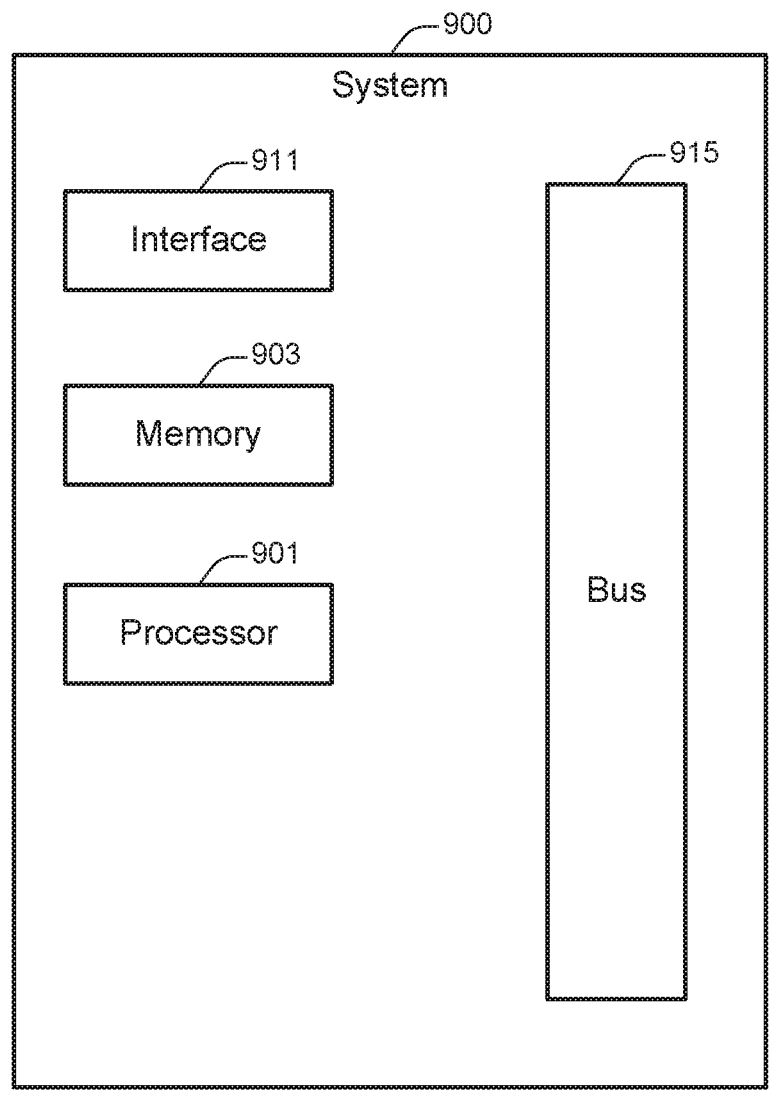
FIG. 9 illustrates an example of a server, configured in accordance with one or more embodiments.

FIG. 9 illustrates one example of a server. According to particular embodiments, a system 900 suitable for implementing particular embodiments of the present invention includes a processor 901, a memory 903, an interface 911, and a bus 919 (e.g., a PCI bus or other interconnection fabric). When acting under the control of appropriate software or firmware, the processor 901 is responsible for implementing applications such as a virtual machine, metadata system, or other such component of the system illustrated in FIG. 1. Various specially configured devices can also be used in place of a processor 901 or in addition to processor 901. The interface 911 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 900 is a virtual machine configured to communicate with one or more clients and one or more cloud storage systems. Although a particular server is described, it should be recognized that a variety of alternative configurations are possible. For example, the modules may be implemented on another device connected to the server. As another example, the system 900 may be employed to implement a metadata server or other component of the system shown in FIG. 1.

According to various embodiments, one or more methods described herein may be implemented entirely or in part on the system 900. Alternately, or additionally, one or more methods described herein may be embodied entirely or in part as computer programming language instructions implemented on one or more non-transitory machine-readable media. Such media may include, but are not limited to: compact disks, spinning-platter hard drives, solid state drives, external disks, network attached storage systems, cloud storage systems, system memory, processor cache memory, or any other suitable non-transitory location or locations on which computer programming language instructions may be stored In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A cloud data storage system comprising:
a metadata system storing file system data, the file system data including a respective metadata entry for each of a plurality of data objects, each metadata entry including a respective cloud storage location at which the data object is stored, the respective cloud storage location corresponding with a respective one of a plurality of available cloud storage providers, wherein the metadata system maintains chain of custody data including a plurality of chain of custody metadata entries, each chain of custody metadata entry indicating an action in which a data object is read, stored, copied, transformed, or erased and an actor that requested the indicated action; and
a virtual machine implemented on a computing device that includes a processor and memory, the virtual machine communicating with the plurality of cloud storage providers via a respective plurality of cloud storage application procedure interfaces (APIs) and with one or more client machines via a plurality of standard data storage protocols, the virtual machine configured to:
receive a first data object from a client machine via a first standard data storage protocol, the virtual machine configured to store the first data object at a first cloud storage location, the virtual machine configured to communicate with the metadata system to create a first metadata entry that includes the first cloud storage location, and
receive a second data object from the client machine via a second standard data storage protocol different from the first standard data storage protocol, the virtual machine further configured to store the second data object at a second cloud storage location, the virtual machine further configured to communicate with the metadata system to create a second metadata entry that includes the second cloud storage location, wherein the first and second cloud storage locations are selected based on access frequencies predicted for the first and second data objects, and
access the metadata system to create a pan-cloud snapshot that provides a standard view of data objects stored in the plurality of available cloud storage providers.

2. The system recited in claim 1, wherein the first standard data storage protocol is selected from the group consisting of: Network File System (NFS), Common Internet File System (CIFS), Internet Small Computer Systems Interface (iSCSI) Tape, Fiber Channel Tape, and Network Data Management Protocol (NDMP).

3. The system recited in claim 1, wherein the plurality of available cloud storage providers includes Amazon Web Services (AWS), Microsoft Azure, and Google Cloud.

4. The cloud data storage system recited in claim 1, wherein each metadata entry includes a respective client identifier, the client identifier corresponding with a respective one of a plurality of client accounts, the client account being the owner of the data object associated with the metadata entry.

5. The cloud data storage system recited in claim 1, wherein the virtual machine is further configured to receive a request to retrieve the first data object.

6. The cloud data storage system recited in claim 5, wherein the virtual machine is further configured to communicate with the metadata system to identify the fir cloud storage location.

7. The cloud data storage system recited in claim 6, wherein the virtual machine is further configured to communicate with the metadata system to retrieve the first data object from the first cloud storage location and to transmit the first data object to the client machine.

8. A method comprising:
   receiving a first data object from a client machine via a first standard data storage protocol, the request being received at a virtual machine implemented on a computing device that includes a processor and memory;
   receiving a second data object from the client machine via a second standard data storage protocol different from the first standard data storage protocol, the request being received at the virtual machine;
   storing the first data object at a first cloud storage location;
   communicating with a metadata system to create a metadata entries for each of a plurality of data objects including the first and second data objects, each metadata entry including a respective cloud storage location at which the data object is stored, the cloud storage location corresponding with a respective one of a plurality of available cloud storage providers, the virtual machine communicating with the plurality of cloud storage providers via a respective plurality of cloud storage application procedure interfaces (APIs) and with one or more client machines via a plurality of standard data storage protocols, wherein the metadata system is further configured to maintain chain of custody data including a plurality of chain of custody metadata entries, each chain of custody metadata entry indicating an action in which a data object is read, stored, copied, transformed, or erased and an actor that requested the indicated action, wherein the first and second cloud storage locations are selected based on access frequencies predicted for the first and second data objects; and
   accessing the metadata system to create a pan-cloud snapshot that provides a standard view of data objects stored in the plurality of available cloud storage providers.

9. The method recited in claim 8, wherein the first standard data storage protocol is selected from the group consisting of: Network File System (NFS), Common Internet File System (CIFS), Internet Small Computer Systems Interface (iSCSI) Tape, Fiber Channel Tape, and Network Data Management Protocol (NDMP).

10. A computing device comprising:
    a memory module;
    a communications interface that receives a first data object from a client machine via a first standard data storage protocol and to store the first data object at a first cloud storage location, and that receives a second data object from the client machine via a second standard data storage protocol different from the first standard data storage protocol and to store the second data object at a second cloud storage location; and
    a processor operable to implement a virtual machine configured to communicate with a metadata system to create metadata entries for each of a plurality of data objects including the first data object, each metadata entry including a respective cloud storage location at which the data object is stored, the respective cloud storage location corresponding with a respective one of a plurality of available cloud storage providers, the virtual machine communicating with the plurality of cloud storage providers via a respective plurality of cloud storage application procedure interfaces (APIs) and with one or more client machines via a plurality of standard data storage protocols, wherein the metadata system is further configured to maintain chain of custody data including a plurality of chain of custody metadata entries, each chain of custody metadata entry indicating an action in which a data object is read, stored, copied, transformed, or erased and an actor that requested the indicated action, wherein the first and second cloud storage locations are selected based on access frequencies predicted for the first and second data objects, and wherein the processor is further operable to access the metadata system to create a pan-cloud snapshot that provides a standard view of data objects stored in the plurality of available cloud storage providers.

11. The computing device recited in claim 10, wherein the plurality of available cloud storage providers includes Amazon Web Services (AWS), Microsoft Azure, and Google Cloud.

12. The computing device recited in claim 10, wherein each metadata entry includes a respective client identifier, the client identifier corresponding with a respective one of a plurality of client accounts, the client account being the owner of the data object associated with the metadata entry.

13. The computing device recited in claim 10, wherein the virtual machine is further configured to receive a request to retrieve the first data object.

14. The computing device recited in claim 13, wherein the virtual machine is further configured to communicate with the metadata system to identify the first cloud storage location.

15. The computing device recited in claim 14, wherein the virtual machine is further configured to communicate with the metadata system to retrieve the first data object from the first cloud storage location and to transmit the first data object to the client machine.

16. The computing device recited in claim 10, wherein the virtual machine is further configured to receive a search query that includes one or more search criteria for identifying data objects stored via the virtual machine.

17. The computing device recited in claim 16, wherein the virtual machine is further configured to communicate with the metadata system to identify a first set of data objects that may meet one or more of the search criteria.

18. The computing device recited in claim 17, wherein the virtual machine is further configured to access one or more or more of the first set of data objects to determine a second set of data objects that meet one or more of the search criteria, the second set of data objects being a subset of the first set of data objects.

19. The computing device recited in claim 18, wherein the virtual machine is further configured to create a respective metadata asset tracking entry corresponding to each of the second set of data objects.

* * * * *